UNITED STATES PATENT OFFICE.

JULIUS ALTSCHUL, OF BERLIN, GERMANY, ASSIGNOR TO ACTIEN-GESELL-SCHAFT FÜR ANILIN FABRIKATION, OF BERLIN, GERMANY.

PROCESS OF MAKING SILK FIBROIN PEPTONE.

No. 813,272.   Specification of Letters Patent.   Patented Feb. 20, 1906.

Application filed October 14, 1905. Serial No. 282,847.

*To all whom it may concern:*

Be it known that I, JULIUS ALTSCHUL, chemist, a citizen of the United States of America, residing at No. 10 Hafenplatz, Berlin, Germany, have invented a certain new and useful Process for the Manufacture of Silk Fibroin Peptone, of which the following is a specification.

E. Fischer has described a process for converting silk fibroin into the corresponding peptone by immersing it in three times its weight of hydrochloric acid of 1.19 specific gravity and allowing the whole to remain at the temperature of the room for sixteen hours. The hydrochloric acid is then evaporated under greatly-diminished pressure at a temperature not exceeding 40° centigrade. The residue is dissolved in water and the hydrochloric acid contained in the solution as chlorid or hydrochlorid is precipitated by adding silver carbonate. After filtration the dissolved silver is precipitated by addition of the exact proportion of hydrochloric acid, and the filtrate from this precipitate is evaporated.

Silk-waste being abundant, silk fibroin peptone may find application as a nutritive preparation, particularly for subcutaneous injection, inasmuch as it does not prevent coagulation of the blood, in contradistinction to all other known proteid substances which prevent the coagulation, and therefore cannot be used subcutaneously in sufficient quantity. Fischer's process, however, is too costly and complicated for preparing the peptone on a commercial scale. The process depends for its success on minute observance of the proper conditions of time, temperature, and concentration of the hydrochloric acid. The least deviation from the prescribed conditions leads to the production of bodies which coagulate the blood.

The present invention relates to a process for the manufacture of the peptone in question which yields the desired product with certainty, even though the conditions be varied within comparatively wide limits. Moreover, the invention does not require the use of hydrochloric acid, so that the tedious evaporation and the use of costly silver carbonate are avoided.

The invention consists in treating silk fibroin with a mineral acid capable of forming insoluble salts with metals of the alkaline earths—for instance, with sulfuric acid, phosphoric acid, or hydrofluoric acid. The silk fibroin is stirred with the acid, wherupon it dissolves, and the solution is allowed to remain at a temperature between 0° and 25° centigrade, according to the strength of the acid employed. A progressive change occurs, sericin being first produced and then silk fibroin peptone. The progress of the change is watched by adding alcohol to a test portion, which no longer produces more than a very small precipitate when the conversion into peptone is complete. When this is the case, the whole is diluted with water neutralized with an alkaline earth or its carbonate or with another base or carbonate that forms an insoluble salt with the acid and filtered. The filtrate is evaporated, preferably in a vacuum, and the residue may be freed from small quantities of inorganic salts by redissolving it in dilute alcohol or acetone.

The following example illustrates the invention: Eight parts, by weight, of silk fibroin, made by repeatedly boiling silk-waste with water under two atmospheres pressure in known manner, are introduced in a perfectly dry condition into fifty parts, by weight, of sulfuric acid of eighty per cent. strength, care being taken that the temperature does not rise above 25° centigrade. The mass, which at first swells, gradually passes into solution as the liquid is left at 25° centigrade. After three days alcohol added to a test portion produces hardly any precipitate. The whole is now introduced into ten parts of ice and thirty parts of water, neutralized gradually by addition of seventy-five parts of chalk, then heated with steam and filtered from the calcium sulfate and excess of chalk. The clear filtrate is evaporated to dryness in a vacuum or is first evaporated in a small volume at the ordinary pressure at a low temperature and then completely dried in a vacuum. In either case it is advantageous to filter off the separated salts before the end of the evaporation. The peptone thus obtained may be purified by dissolving it in five parts of cold acetone of fifty per cent. strength, filtering the solution from undissolved salts, and drying the filtrate in a vacuum.

Instead of sulfuric acid phosphoric acid of eighty per cent. strength may be used; but the peptonization then occupies a somewhat longer time. On the other hand, if diluted hydrofluoric acid is used the peptonization is performed more quickly.

Having thus described the nature of my said invention and the best means I know of carrying the same into practical effect, I claim—

1. A process for the manufacture of silk fibroin peptone which consists in treating silk fibroin with a mineral acid which forms insoluble salts with alkaline-earth metals until addition of alcohol to a sample causes only a slight precipitate, neutralizing the acid by converting it into an insoluble alkaline-earth salt, filtering and evaporating the filtrate to dryness.

2. A process for the manufacture of silk fibroin peptone which consists in treating silk fibroin with strong sulfuric acid until addition of alcohol to a sample causes only a slight precipitate, neutralizing the acid by converting it into an alkaline-earth salt, filtering and evaporating the filtrate to dryness.

3. A process for the manufacture of silk fibroin peptone which consists in introducing silk fibroin into several times its weight of sulfuric acid of eighty per cent. strength, allowing the mixture to remain at a temperature between 0° centigrade and 25° centigrade until the addition of alcohol to a sample causes only a slight precipitate, adding an alkaline-earth carbonate in quantity sufficient to neutralize the acid, filtering and evaporating the filtrate to dryness at a low temperature.

4. A process for the manufacture of silk fibroin peptone which consists in introducing silk fibroin into several times its weight of sulfuric acid of eighty per cent. strength, allowing the mixture to remain at a temperature between 0° and 25° centigrade until the addition of alcohol to a sample causes only a slight precipitate, adding an alkaline-earth carbonate in quantity sufficient to neutralize the acid, filtering and evaporating the filtrate to dryness at a low temperature, redissolving the residue in a solvent that does not dissolve the inorganic salts, filtering the solution, and evaporating it to dryness at a low temperature.

In testimony whereof I have signed my name to this specification in the presence of two subscribing witnesses.

JULIUS ALTSCHUL.

Witnesses:
HENRY HASPER,
WOLDEMAR HAUPT.